United States Patent [19]

Durbin

[11] Patent Number: 5,902,988
[45] Date of Patent: May 11, 1999

[54] READER FOR DECODING TWO-DIMENSIONAL OPTICALLY READABLE INFORMATION

[75] Inventor: Dennis A. Durbin, Cedar Rapids, Iowa

[73] Assignee: Norand Corporation, Cedar Rapids, Iowa

[21] Appl. No.: 08/461,605

[22] Filed: Jun. 5, 1995

Related U.S. Application Data

[63] Continuation of application No. 08/277,132, Jul. 19, 1994, abandoned, which is a continuation-in-part of application No. 07/919,488, Jul. 27, 1992, abandoned, which is a continuation of application No. 07/889,705, May 26, 1992, abandoned, which is a continuation of application No. 07/849,771, Mar. 12, 1992, abandoned.

[51] Int. Cl.$^6$ .................................................... G06K 7/10
[52] U.S. Cl. ............................................. 235/472; 235/462
[58] Field of Search ................................... 235/456, 462, 235/470, 472, 466, 469; 382/59; 358/224; 348/333, 334

[56] References Cited

U.S. PATENT DOCUMENTS

| | | | |
|---|---|---|---|
| 3,513,320 | 5/1970 | Weldon | 235/469 |
| 4,044,227 | 8/1977 | Holm et al. | |
| 4,360,798 | 11/1982 | Swartz et al. | |
| 4,369,361 | 1/1983 | Swartz et al. | 235/462 |
| 4,488,679 | 12/1984 | Bockholt et al. | 235/469 |
| 4,538,060 | 8/1985 | Sakai et al. | |
| 4,734,566 | 3/1988 | Senda et al. | |
| 4,764,668 | 8/1988 | Hayard | 235/470 |
| 4,786,792 | 11/1988 | Pierce et al. | 235/456 |
| 4,818,856 | 4/1989 | Matsushima et al. | |
| 4,822,986 | 4/1989 | Guthmueller et al. | 235/462 |
| 4,877,949 | 10/1989 | Danielson et al. | 235/462 |
| 5,107,100 | 4/1992 | Shepard et al. | 235/472 |
| 5,117,098 | 5/1992 | Swartz | 235/472 |
| 5,124,539 | 6/1992 | Krichever et al. | 235/472 |
| 5,212,371 | 5/1993 | Boles et al. | 235/472 |
| 5,331,176 | 7/1994 | Sant'Anselmo et al. | 235/472 |
| 5,347,113 | 9/1994 | Reddersen et al. | |
| 5,414,250 | 5/1995 | Swartz et al. | |
| 5,414,251 | 5/1995 | Durbin | |
| 5,466,921 | 11/1995 | Lapinski et al. | 235/462 |
| 5,504,316 | 4/1996 | Bridgelall et al. | 235/462 |

FOREIGN PATENT DOCUMENTS

| | | | |
|---|---|---|---|
| 0 349 770 | 8/1984 | European Pat. Off. | |
| 0349770 | 1/1990 | European Pat. Off. | |
| 0 385 478 | 3/1990 | European Pat. Off. | |
| 0385478 | 9/1990 | European Pat. Off. | |
| WO 93/18478 | 9/1993 | European Pat. Off. | |
| 0120388 | 5/1988 | Japan | 382/59 |
| 63-253483 | 10/1988 | Japan | |
| 100684 | 4/1989 | Japan | 382/59 |
| 0198175 | 8/1991 | Japan | 235/462 |
| 5-94556 | 4/1993 | Japan | 235/469 |
| 5-174204 | 7/1993 | Japan | 235/469 |
| 406162247 | 6/1994 | Japan | 235/462 |

OTHER PUBLICATIONS

Mark Alpert, "Building a Better Bar Code", Jun. 15, 1992, p. 101 Fortune Magazine.
E.R. Williams, "Two–Dimensional Image Sensor Using One–Dimensional Sensor Array", Jul., 1978, vol. 21, No. 2, pp. 436–437, IBM Technical Disclosure Bulletin.
Hitachi Ltd., vol. 13, No. 66, p. 828, Oct. 1988.

*Primary Examiner*—Thien Minh Le
*Attorney, Agent, or Firm*—Suiter & Associates, PC

[57] ABSTRACT

A scanner for reading two-dimensional optical information sets is described which includes a housing for supporting a photosensitive array associated with an optical string adapted to focus optical information on the array. Also provided are array and optical string controls for controlling the array and optical string such that the output of selected images on the array are processed via pattern recognition means. Images recognized to contain decodable optical information are displayed and highlighted by a display. In this fashion a user is assisted in aiming, recognizing, confirming the decodability, and decoding images of optical information incident on the array.

27 Claims, 6 Drawing Sheets

READER FOR DECODING TWO-DIMENSIONAL OPTICALLY READABLE INFORMATION

CROSS REFERENCE TO RELATED APPLICATIONS

This application is a continuation-in-part of U.S. application Ser. No. 07/919,488 filed on Jul. 27, 1992 which in turn was a continuation-in-part of the following U.S. patent application Ser. No. 07/849,771 filed on Mar. 12, 1992; and Ser. No. 07/889,705, filed on May 26, 1992, now abandoned.

BACKGROUND OF THE INVENTION

1. Technical Field

The present invention is directed to optical information readers and more particularly to readers adapted to selectively decode two-dimensional optical information sets.

2. Description of the Prior Art

Conventional bar code symbols have small data storage capacities. This reduces the utility of conventional bar code scanner and reader systems. For example, the 11 digit Uniform Pricing Code found on most supermarket items acts as an identifying number which may be utilized to access information in a database. Codes of this type do not carry information along their vertical axis, and are therefore, less prone to skewing errors during decoding.

Two-dimensional bar code symbols or "portable data files" have recently been developed. With codes of this type access to a database is not required since the code contains the information which would normally be keyed for in a database. Since reliance on a database is not required, information may be accessed and exchanged more readily and reliably. However, in order to decode two-dimensional codes a more sophisticated apparatus is required. This is primarily true since normal vertical code redundancy is not present, making code registration, orientation, and condition very important.

Several two-dimensional coding standards have been proposed, e.g., Code 49, 16K, Identicode MLC-2D, and Code PDF417. While such codes are capable of storing information such as price, name of product, manufacturer, weight, expiration date, inventory data, shipping information, and the like; apparatus which assist the user in aiming and decoding two-dimensional codes are not currently available. For example, two dimensional codes might consist of a stack of conventional linear codes. Each line may contain different information, such as (1) pricing information, (2) product name, (3) name of the manufacturer, (4) product weight, (5) expiration date, (6) inventory data, (7) shipping information, and the like. Additionally, a user may require the ability to selectively store or send portions of the decoded bar code symbol.

3. Objects of the Invention

Therefore, it is a principal object of the present invention is to provide a scanner adapted to selectively read two-dimensional optical information sets.

Another object of the present invention is to provide a scanner adapted to selectively read two-dimensional optical information sets in ambient light.

Another object of the present invention is to provide a scanner adapted to selectively read two-dimensional optical information sets from a wide range of distances.

Another object of the present invention is to provide a scanner adapted to selectively read two-dimensional optical information sets while assisting a user in aiming the reader.

Another object of the present invention is to provide a scanner adapted to selectively read two-dimensional optical information sets which is economical to manufacture and durable in use.

Finally, another object of the present invention is to provide a scanner adapted to selectively read two-dimensional optical information sets which is efficient in operation, simple in construction, easy to use, and trouble free. These and other objects will be apparent to those skilled in the art.

SUMMARY OF THE INVENTION

The present invention discloses a novel scanner for reading two-dimensional optical information sets. In one exemplary embodiment the invention includes a housing for supporting a photosensitive array associated with an optical string means which is adapted to focus optical information on the array. Also provided are array and optical string control means for controlling the array and optical string such that the output of selected images on the array are processed via pattern recognition means. Images recognized to contain decodable optical information are displayed and highlighted by the display means. In this fashion a user is assisted in aiming, recognizing, and confirming the decodability of the image incident on the array.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EXEMPLARY EMBODIMENTS

Two preferred exemplary embodiments of the present invention 10 and 100 are illustrated in FIGS. 1 through 7

(FIGS. 1, 4, 6, and 7; and FIGS. 1, 5, 6, and 7 respectively). Both embodiments teach the construction and use of readers capable of decoding "portable data files."

Each exemplary embodiment utilizes image capture means, pattern recognition means, and a real time display for assisting a user in aiming, recognizing, confirming decodability, and decoding two-dimensional bar code symbols. The embodiments (10, 100) differ primarily in the particular construction and operation of their image capture means.

Figure 5:
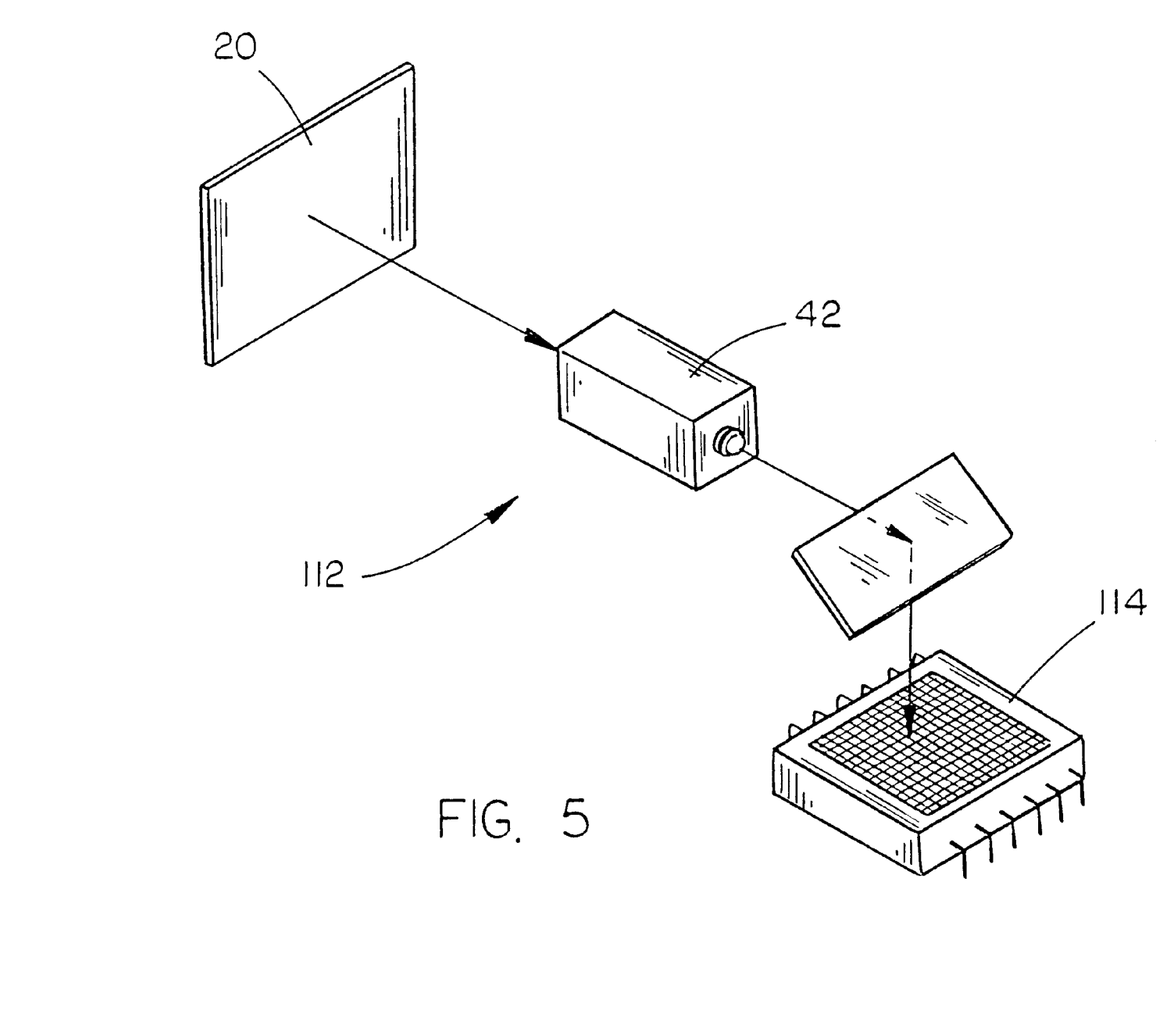
FIG. 5 is a highly diagrammatic perspective view of the image capturing elements of a two-dimensional array exemplary embodiment of the present invention.

In a first exemplary embodiment 10 the image capture means 12 utilizes a one-dimensional photosensitive array 14 to read images in a horizontal (X) direction and mechanical means 16 to read images in a vertical direction. Conversely, in a second exemplary embodiment 100 the image capture means 112 utilizes a two-dimensional photosensitive array 114 to read images in horizontal (X) and vertical (Y) directions (FIG. 5).

Figure 4:
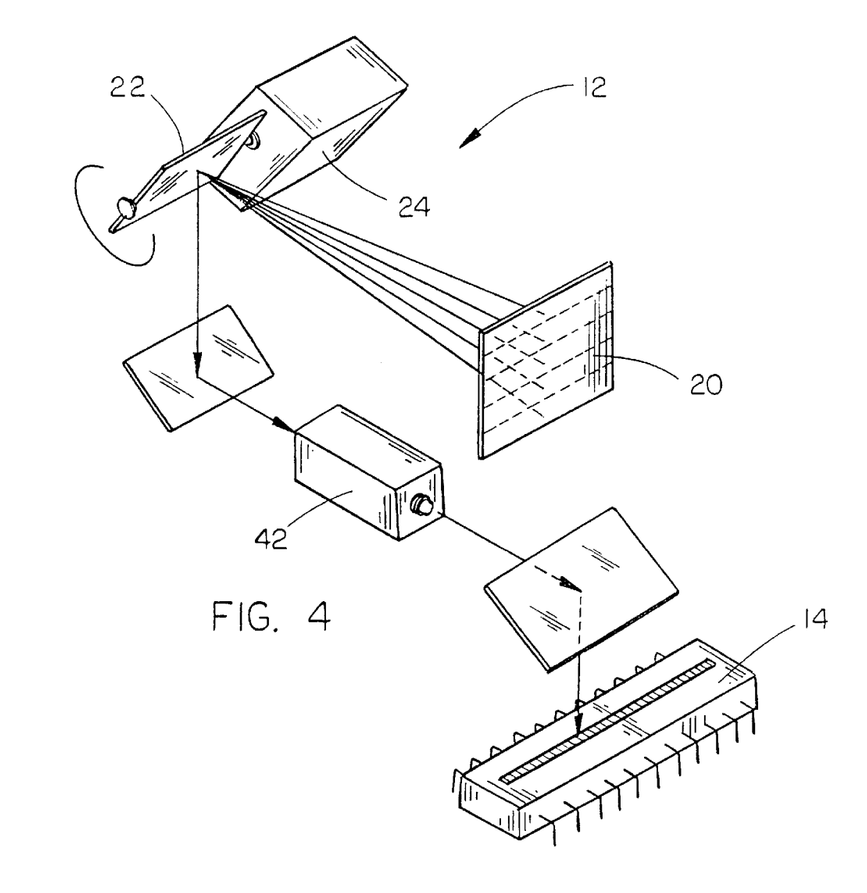
FIG. 4 is a highly diagrammatic perspective view of the image capturing elements of a linear array exemplary embodiment of the present invention.

Turning to the first exemplary embodiment 10, having image capture means 12, best illustrated in FIG. 4, vertical components 16 of a two-dimensional bar code symbol 20 are read by rastering succeeding horizontal components 18 across a single line photosensitive array 14. This is accomplished, in such an exemplary embodiment, via a mirror 22 rotatably mounted about its horizontal plane. The mirror 22 is rotatably connected and driven by mirror control means 24. In a preferred exemplary embodiment an extremely low mass mirror prism (22) may be utilized and driven by solenoids, a piezo, or the like (24).

In this embodiment 10, an expanded 5,000 pixel single line photosensitive array 14 may be utilized. However, a 2,048 pixel one-dimensional line photosensitive array would also work with a reduced range. A special photosensitive array might also be designed with faster scan line times and reduced power requirements.

Figure 6:
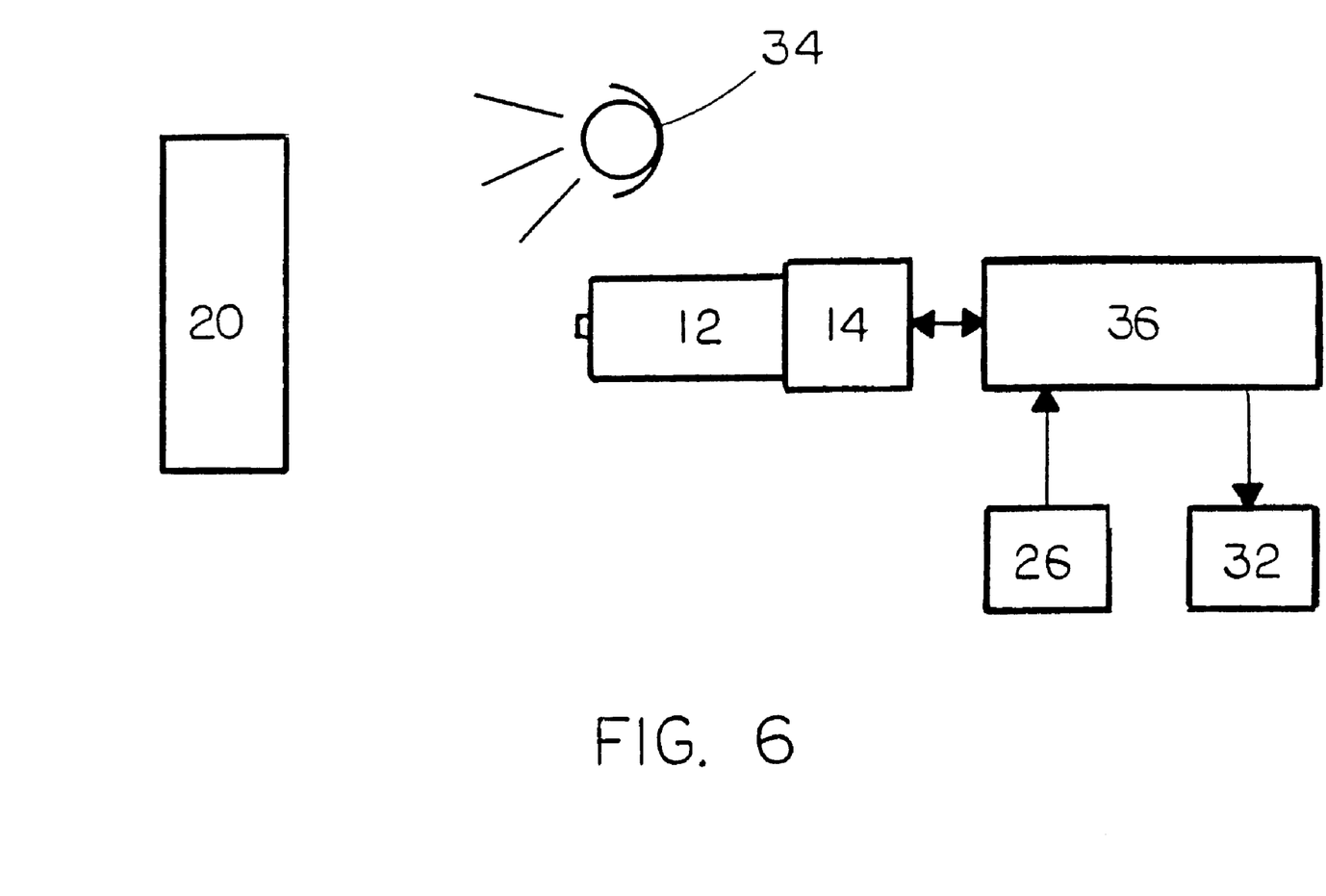
FIG. 6 is a block diagram illustrating the various components of the present invention.

Vertical raster (Y) is variable under microprocessor 26 control (FIG. 6). Likewise, the readout speed of the photosensitive array 14 is variable under microprocessor 26 control wherein the readout is preferably based on analyzed data recovered on each scan. Likewise, integration time and gain of sense amplifiers and filters acting on the photosensitive array 14 data may also be variable under microprocessor 26 control.

Additionally, an electronic option to read lower density bar code symbols could also be incorporated wherein every other, every third, or every fifth pixel might be read. Likewise, an electronic option to read high density short strings might also be incorporated wherein the left 1666, then center 1666, and then right 1666 pixels are read.

In another exemplary species of this embodiment 10 the photosensitive array shift register drives are built into the array. Electronic control of each charge well might also be provided such that wells not in use would not exist to the microprocessor 26. Such a configuration prevents dark currents from filling empty wells. Additionally, wells might also be created by the microprocessor 26 just prior to use. Thus, no special cleaning cycles will be necessary.

In another exemplary species of this embodiment 10 the interface could be more parallel wherein multiple photosensitive array 14 shift sections could each shift out their own output, for example, five outputs (each shifting 1000 pixels), or ten at 500 pixels, etc. Such a design would also utilize square pixel dimensions in order to maintain equal vertical and horizontal density.

The image capture means 12 may also include autofocus means. Autofocus could be accomplished via infrared or ultrasonic independent means, or via the use of photosensitive array scans in order to maximize transition sharpness of the received image, or the like. Likewise, the image capture means 12 would also include zoom controlled by the user.

Aiming of the reader 10 would be accomplished by physical proximity for close range (contact to two inches). The use of spotter beams is not desired because of their additional cost and tendency to washout in lighted areas. Aiming of the reader 10 for long range would be accomplished via a display 28 (<1 to 20 plus feet). The display 28, in a preferred exemplary embodiment 10, would be a one inch CAT, dedicated LCD graphics screen, or even a terminal screen on an integrated scanner.

Figure 1:
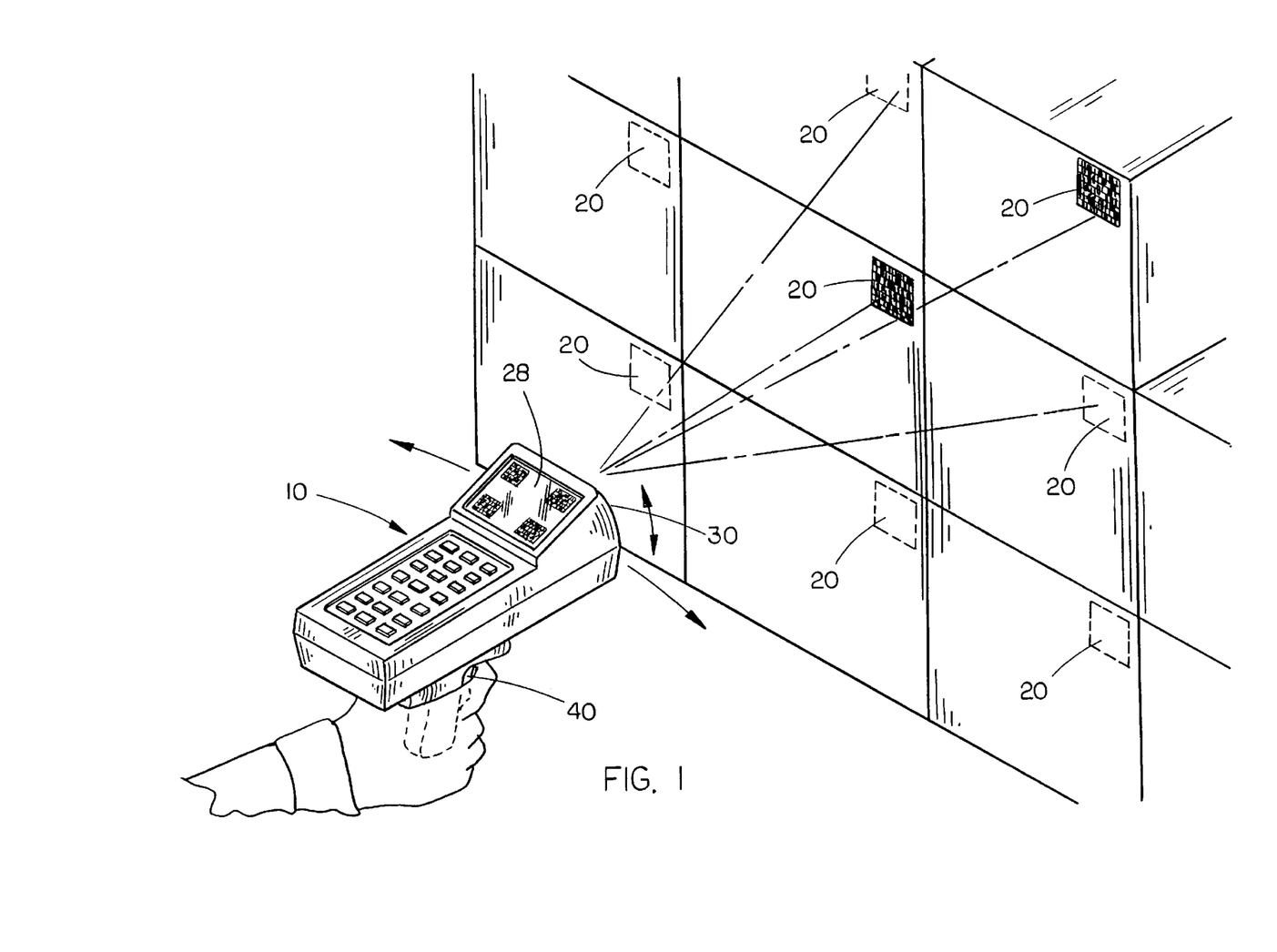
FIG. 1 is a perspective view of a preferred embodiment of the two-dimensional optical information reader showing a user being assisted by the display of the reader in aiming.
Figure 2:
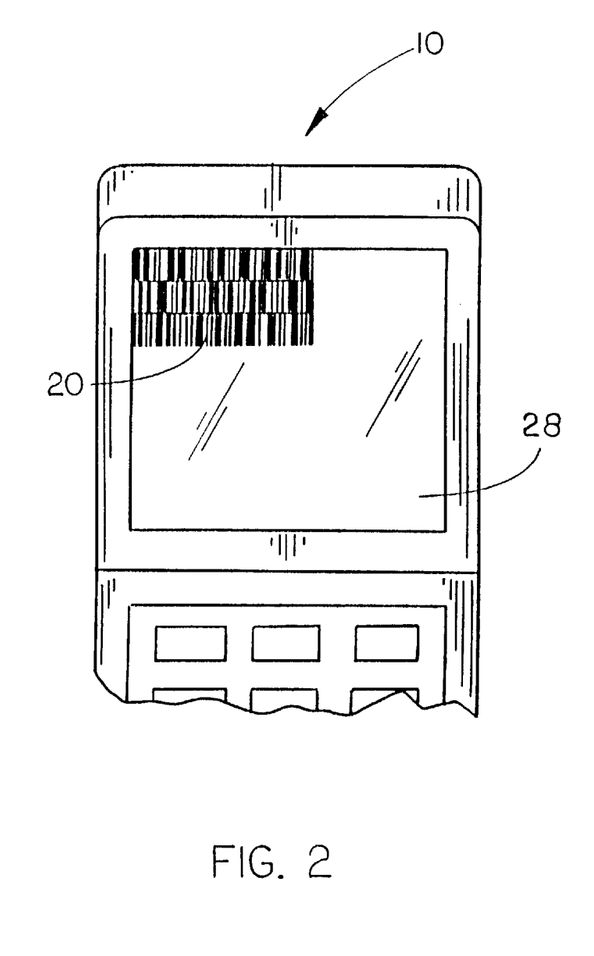
FIG. 2 is a partial top perspective view of the reader illustrating the display wherein the display indicates to a user that a two-dimensional, decodable, bar code symbol may be read if the user adjusts the aim of the reader to the left and above.
Figure 3:
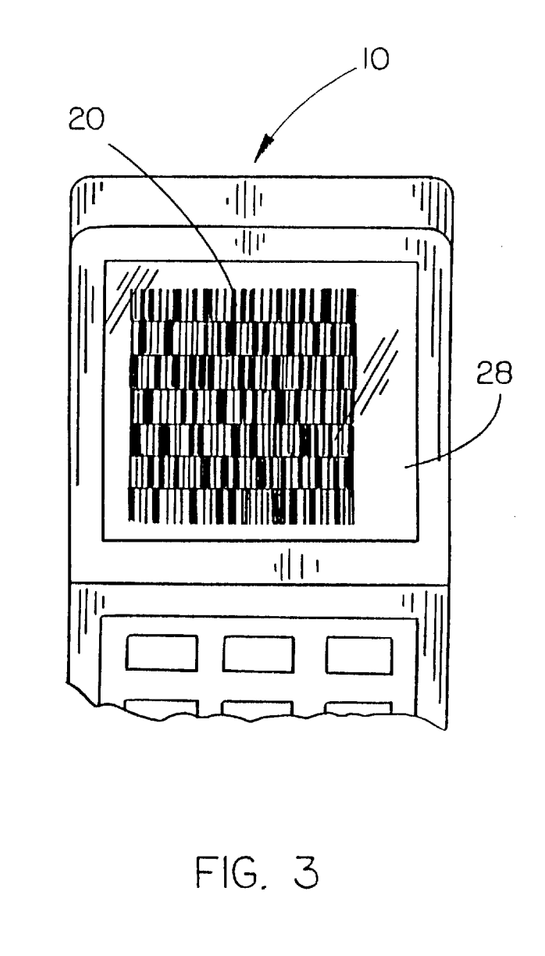
FIG. 3 is a partial top perspective view of the reader illustrating the display wherein the display indicates to a user that a two-dimensional, decodable bar code symbol is centered in view and available for reading.

In such an embodiment 10 low resolution scanning may be performed while aiming. Image processing techniques would then be utilized to display lines and shadows with sufficient aiming detail (FIGS. 1, 2, and 3). The microprocessor 26 would then utilize pattern recognition techniques to locate rectangular shapes (or other information encoded shapes). Where the microprocessor 26 locates rectangular shapes (or other information encoded shapes) which might be decodable bar code symbols, the closest such shape to the center of the reader 10 window 30 would then be displayed on the display 28 in a highlighted manner, e.g., flashing, reverse video, or the like. During this same time period the microprocessor 26 may also make an attempt to decode the contents within the highlighted area. Then, if the decode attempt is successful, the highlighted area could return to normal, or the like, in order to notify the user that the decode was successful and that the user may either accept or reject the data. If the data is from the wrong bar code symbol, or the wrong portion of a correct bar code symbol, then the user may aim at a new area without accepting the data.

The use of zoom during aim induces jitter, therefore, in order to overcome this problem, more data may be scanned than is viewed on the display 28. If 1,000 pixels are collected but only 700 are viewed on the display 28, then the microprocessor 26 may compare general patterns of each scan to detect motion and adjust the data sent to the display 28 to compensate for the motion. Additionally, as the displayed portion of the collected pixel picture reaches a boundary of the pixel picture, then the displayed picture would start to move such that the center of the collected data is then shown as the displayed picture. In another species of an exemplary embodiment 10 all rectangular areas within the displayed area may be highlighted to indicate to a user which areas are probable bar codes, and may annunciate that bar code symbol, or portion thereof, which the microprocessor 26 is currently attempting to decode.

Illumination might come from an internal source, LED's or such, where the light 34 would be on continuously during the aiming and decoding. The light 34 would be variable under processor control in order to reduce power consumption.

Additionally, local illumination would only be necessary over a nominal distance. Beyond this, ambient light would contribute more and more of the actual bar code illumination. While indoors, flood lighting or indoor overhead lights would be necessary. The intention of this design is such that if the user can see the bar code, the reader 10 will also, and decoding is possible.

Neural network and fuzzy logic processor programming and hardware design/architecture are both required. Digital signal processing techniques may also be used to help improve the basic data collected as far as signal level normalization within the bar code rectangular areas, taking advantage of bar codes still being printed in 2 colors only. Neural network concepts of weighted inputs and highly parallel processing would then be used during aiming and during a search for potential bar code 20 rectangles.

The use of concise dedicated functional neural processor, each with a single function, all reduced to silicon and all placed in a single ASIC is preferred. In this manner, 20 microprocessors, wherein one looks for a vertical line, another for a horizontal line, and another for angles, and the like, could all examine the same data base at the same time. Very high speed data (image) evaluation will also be utilized in a preferred embodiment for both aiming and decoding. The same microprocessors could also be responsible for power control in the image capture means 12. Additionally, it is preferred that not all processing functions be powered at all times or at the same time. Also, illumination would end and count (data) collection would cease after data was decoded. A communication processor could also be provided and such communication processor could be functional until data was transferred.

A typical operation might be as follows: The user directs the reader 10 toward the bar codes 20 to be read (FIG. 1). The user pulls a trigger means 40 to activate the aiming sequence. The user views the display 28 to verify reader 10 aim. The reader 10 auto focuses, starting with the focus setting of the previous read. The user views the display 28 and moves the reader 10 and starts to zoom as necessary as the desired bar code symbol 20 comes into view (FIG. 2). The reader 10 continues to show the viewed field in the display 10 even as it decodes the bar code symbol 20. The reader 10 highlights the decoded bar code symbol 20 (FIG. 3). The user may accept the decoded data via the trigger means 40, or the like. If the user does not want the data, he or she may move the reader 10 such that another desired bar code symbol 20 is centered and highlighted as decoded, or such that no bar code is highlighted and no decode would occur.

This feature is very beneficial in that one bar code can be selected on a page containing many adjacent codes without the sometimes impossible requirement of ensuring the scan line (laser) goes through only the desired code.

Figure 7:
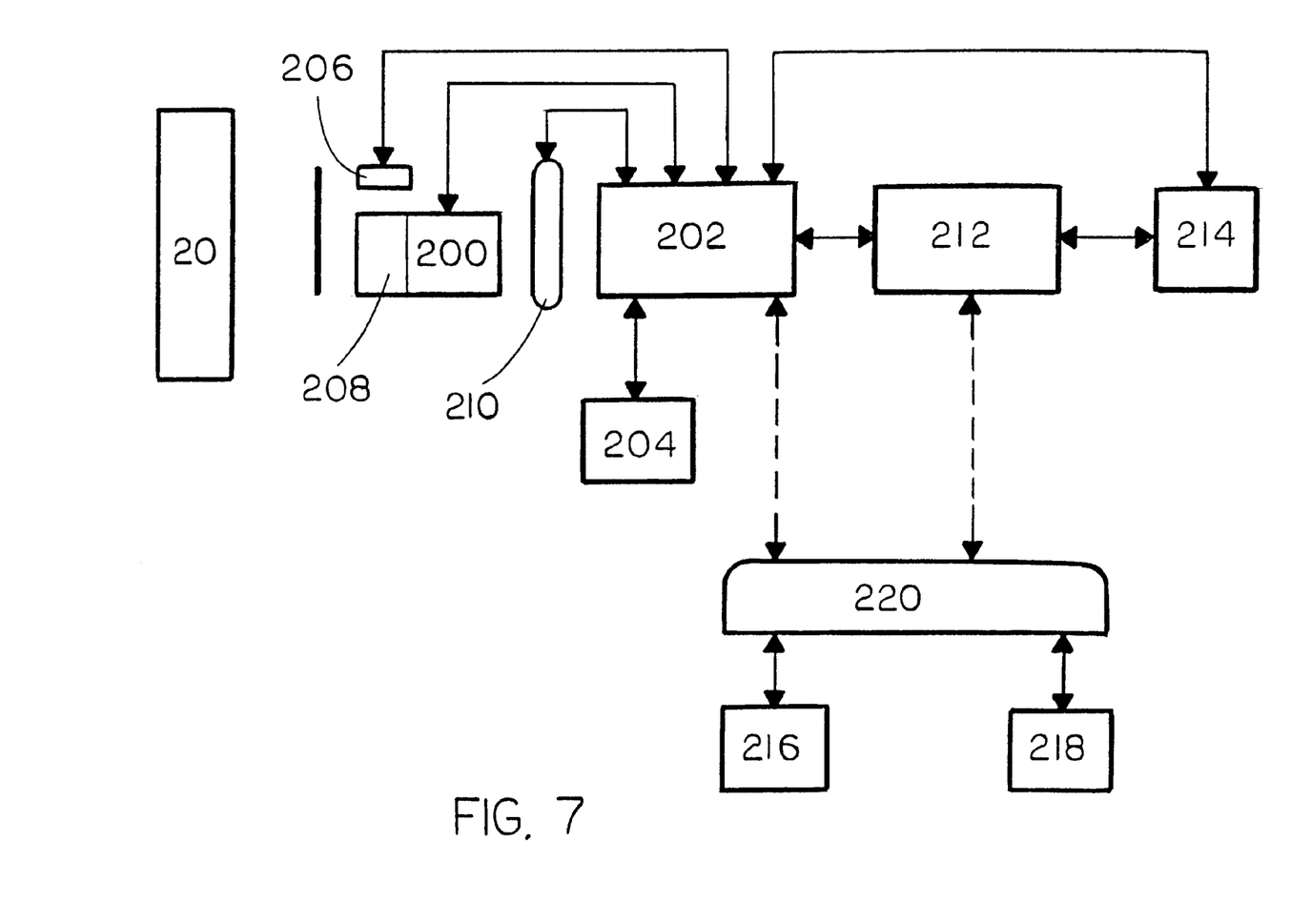
FIG. 7 is a more detailed block diagram illustrating the various components of the present invention.

FIG. 7 is a block diagram illustrating the functional block organization of an exemplary embodiment of the present invention. The optic string 200 allows for image focus and zoom. Both focus and zoom management are provided by the control processor 202. The input switches 204, such as the trigger 40, may be utilized to enable the scan function, or the like. While in the scan mode, focusing may be achieved according to at least two methods. As shown, there is a focus block function 206 which may utilize a separate range detection circuit (i.e., such as ultra-sonic or infra-red ranging means). This is the first type of focusing method. This method allows the control processor 202 to determine the range of an image from the scanner and move the lens assembly 208 accordingly without powering up, or at least without operating the image sensor 210 circuitry, data analyzing means 212, and display 214. In this fashion battery power is conserved. The second type of focusing method utilizes the image sensor 210/processing means 212 to detect a lack of focus by data frequency analysis, i.e., moving the lens assembly 208 in order to maximize the high frequency content of the image data. The second type of focusing requires fewer parts, but more power and the initial corrective movement may be in an incorrect direction. Using past direction history will improve chances of correct initial direction choice. Also any optically required focus adjustments due to zoom changes may be obtained from a look-up table within the control means and included in the control of focus during zoom changes.

The image sensor may be either a single line several thousand pixel sensor (from at least 1000 to 5000 pixels depending on scan requirements) or an array sensor with from at least 500 to 1500 pixels in both the X and Y axis. The preferred mode is to utilize an array sensor since it is both faster and requires fewer moving parts. However, cost and power requirements are greater with an array sensor.

As previously discussed, a one dimensional array requires motion in the orthogonal direction to the pixel layout in order to obtain a 2-D image. The pixels in both sensors are square in dimension in order to maintain relative dimensions in both X and Y directions. One method of providing vertical dithering (back and forth) is via a piezo element driven mirror within a folded optic path. However, a rotating polygon cylinder may also be utilized.

In order to reduce power and gain speed in honing in on an image, both image sensor methods allow partial reading of the sensor fields. This means that during a line scan of a one line sensor, a programmably controlled number of pixels are skipped within the sensor on a cyclic basis in order to obtain less dense scan information more rapidly. For instance, reading only every other, every third, or every fifth pixel means less taken to process the data. A less detailed image is acquired, but speed, not great detail is required for general aiming and setup. In the vertical direction, the mirror is moved further between samples to compensate for the partial pixel sample and in order to keep spatial relationships constant. With a two-dimensional array, the same partial pixel viewing is done in both directions at the same rate. Both sensor types allow controlled exposure time independent of cycle time.

The control processor means contains at least one microprocessor. The control processor is responsible for controlling focus, zoom, illumination (if necessary), sensor timing, power management, and communication to other system blocks. The control processor utilizes fuzzy logic decision structures to quickly focus and to analyze the overall image pattern. It is also responsible for controlling the sensor when retrieving high density pixel strings from portions of the sensor. This is useful when a low density pixel scan has enabled the processing function means to recognize a potentially decodable shape. A maximum density scan is then done over that portion of the sensor to try to determine if decode is possible. These high density scan portions might consist of the left, center, and right sections of the sensor. this may also be accomplished by programming start and stop points within the sensor to control which section is retrieved.

Under zoom conditions, user movement will be more apparent and objectionable. The processing function means controls the image sent to the display for assisting the user in aiming the scanner unit. The processing function means helps remove jitter caused by user motion by modifying the image sent to the display. The image sent to the display is a smaller portion of the actual scanned image. Fuzzy logic structures are again used to quickly determine patterns and shapes and track their movement. The smaller (or subset) image that is displayed remains, positioned as is, in the display until the displayed image bumps up against a border of the true collected image. Then the display image starts to move to the rate of user movement. The processor means is continually working to reduce jitter while also trying to recognize and decode potentially decodable images. It also enunciates potentially decodable images in the display, for instance surrounding an image with a solid outline, and marks fully decoded images in another manner, such as reverse video.

Communication control means 220 communicates with the control and processing means to provide interface to a host system. The communication control means 220 may also have its own microprocessor for handling protocol and data transfer. In a tethered version 216 battery power may be self contained or derived from a portable hand-held terminal. Where a wireless link 218 is utilized the communication control means may also control the RF or IR link.

The present invention may be utilized to read two-dimensional data sets which code or symbolize information in at least (i) white, black, and a color; or (ii) white, black, and one shade of gray.

This may be accomplished by utilizing a color two-dimensional array which utilizes three pixels rather than one for each point of resolution. Utilization of such an array reduces the resolution of the reader and its ability to read and decode codes containing smaller coding elements. However, the use of at least three rather than two contrast reflector/absorbers allows more information to be encoded with larger coding elements.

Such codes may also be read by utilizing a filter and a monochrome array wherein frequency response is determined so as to differentiate between different reflector/absorbers. This may be done by utilizing an array tuned to discriminate a particular wavelength. Likewise, the code may be sequentially illuminated with different wavelengths of light in order to aid in the discrimination and decoding process.

INCORPORATION BY REFERENCE

The present invention may be constructed for use in a docking type system for recharging/communicating with the apparatus disclosed herein. A docking station which might be adapted for use with the present invention is disclosed in a copending U.S. application Ser. No. 07/451,322, filed Dec. 15, 1989, which application is incorporated herein by reference in its entirety as illustrating arrangements which may be embodied in a peripheral shell 260 (FIG. 10; Ser. No. 07/451,322). Likewise, the disclosure of U.S. Pat. No. 4,877,949, issued Oct. 31, 1989, is also incorporated herein by reference, in its entirety, as illustrating means for focusing an image of optically readable information over a substantial range of distances. Also incorporated herein by reference is copending U.S. application Ser. No. 07/451,322, filed Dec. 15, 1989, as illustrating a display 14 (FIGS. 13 and 14) adapted to assist a user of an apparatus in reading optically readable information. Finally, also incorporated in its entirety herein by reference is copending U.S. application Ser. No. 07/143,921, filed Jan. 14, 1988, as illustrating optically readable information digitizing and decoding means (FIGS. 7 through 18).

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved two-dimensional optical information reader which accomplishes at least all of the stated objects.

I claim:

1. A portable data collection system for reading indicia in which an information set is encoded, comprising:
   (a) a portable data collection terminal;
   (b) a code reader operatively disposed with respect to said portable data collection terminal for reading the indicia, said code reader comprising a photosensitive array for receiving an image of a linear area of the indicia, and means for successively rastering the linear area of the indicia which said photosensitive array receives wherein said photosensitive array receives an image of the indicia in its entirety whereby the information set may be decoded; and
   (c) means for automatically focusing the image received by said photosensitive array.

2. A portable data collection system as claimed in claim 1, further comprising a communication control circuit operationally connected to said code reader for communication with an external terminal.

3. A portable data collection system as claimed in claim 2, wherein said indicia contains two-dimensionally encoded information, said communication control circuit converting the two-dimensionally encoded information into a format readable by said external terminal.

4. A portable data collection system as claimed in claim 1, further comprising an auto detect circuit for automatically determining the type of an external terminal attached to said portable data collection terminal.

5. A portable data collection system as claimed in claim 1, further comprising an illumination source operationally disposed within said portable data collection terminal for providing auxiliary illumination of the indicia.

6. A portable data collection system as claimed in claim 1, wherein said mastering means includes a mirror for optically manipulating the image received by said photosensitive array and means for rotatably actuating said mirror.

7. A portable data collection system as claimed in claim 6, wherein said means for rotatably actuating said mirror is a solenoid.

8. A portable data collection system as claimed in claim 6, wherein said means for rotatably actuating said mirror is a piezo.

9. A portable data collection system as claimed in claim 1, wherein said rastering means includes a prism for optically manipulating the image received by said photosensitive array and means for rotatably actuating said prism.

10. A portable data collection system as claimed in claim 9, wherein said means for rotatably actuating said prism is a solenoid.

11. A portable data collection system as claimed in claim 9, wherein said means for rotatably actuating said prism is a piezo.

12. A portable data collection system as claimed in claim 1, wherein said photosensitive array is a single line array having at least one pixel.

13. A portable data collection system as claimed in claim 1, wherein said photosensitive array is a single line array having from 1,000 to 5,000 pixels.

14. A portable data collection system as claimed in claim 1, wherein said photosensitive array is a single line array having 2,048 pixels.

15. A portable data collection system as claimed in claim 1, wherein said photosensitive array is a two-dimensional array.

16. A portable data collection system as claimed in claim 1, further comprising a microprocessor operationally connected to said photosensitive array.

17. A portable data collection system as claimed in claim 1, wherein said photosensitive array includes a shift register.

18. A portable data collection system as claimed in claim 17, wherein said photosensitive array includes a drive circuit for driving said shift register.

19. A portable data collection system as claimed in claim 1, further comprising an optic string for providing focusing and zooming of the image received by said photosensitive array thereupon.

20. A portable data collection system as claimed in claim 1, wherein said means for automatically focusing the image received by said photosensitive array includes a range detection circuit.

21. A portable data collection system as claimed in claim 1, wherein said range detection circuit includes an ultrasonic ranger.

22. A portable data collection system as claimed in claim 1, wherein said range detection circuit includes an infrared ranger.

23. A portable data collection system as claimed in claim 1, wherein said means for automatically focusing the image received by said photosensitive array includes means for detecting a lack of focus of the image by data frequency analysis.

24. A portable data collection system for reading indicia in which an information set is encoded, comprising:
 (a) a portable data collection terminal;
 (b) a code reader operatively disposed with respect to said portable data collection terminal for reading the indicia, said code reader comprising a photosensitive array for receiving an image of a linear area of the indicia, and means for successively rastering the linear area of the indicia which said photosensitive array receives wherein said photosensitive array receives an image of the indicia in its entirety whereby the information set may be decoded;
 (c) means for automatically focusing the image received by said photosensitive array; and
 (d) wherein said means for automatically focusing the image received by said photosensitive array includes means for using past focus adjustment direction history to improve chances of correct initial focus adjustment direction choice.

25. A portable data collection system for reading indicia in which an information set is encoded, comprising:
 (a) a portable data collection terminal;
 (b) a code reader operatively disposed with respect to said portable data collection terminal for reading the indicia, said code reader comprising a photosensitive array for receiving an image of a linear area of the indicia, and means for successively rastering the linear area of the indicia which said photosensitive array receives wherein said photosensitive array receives an image of the indicia in its entirety whereby the information set may be decoded;
 (c) means for automatically focusing the image received by said photosensitive array; and
 (d) wherein said means for automatically focusing the image received by said photosensitive array includes a look up table for controlling focus during zoom changes.

26. A portable data collection system for reading indicia in which an information set is encoded, comprising:
 (a) a portable data collection terminal;
 (b) a code reader operatively disposed with respect to said portable data collection terminal for reading the indicia, said code reader comprising a photosensitive array for receiving an image of a linear area of the indicia, and means for successively rastering the linear area of the indicia which said photosensitive array receives wherein said photosensitive array receives an image of the indicia in its entirety whereby the information set may be decoded;
 (c) means for automatically focusing the image received by said photosensitive array; and
 (d) wherein said means for automatically focusing the image received by said photosensitive array includes means for utilizing fuzzy logic decision structures to quickly focus and analyze the overall image pattern of the image received by said photosensitive array.

27. A system for encoding and decoding information, comprising:
 (a) a two-dimensional code encoding information via at least two coding elements which may be repeated to symbolize any information set and wherein each of the coding elements may reflect light of at least one of three wavelengths of electromagnetic energy;
 (b) a reader for decoding information encoded via at least two coding elements which may be repeated to symbolize any information set and wherein each of the coding elements may reflect light of at least one of three wavelengths of electromagnetic energy;
 (c) said reader including pattern recognition means for locating and recognizing said two-dimensional code; and
 (d) means for automatically focusing the image received by said reader.

* * * * *